Sept. 27, 1932.  R. W. SETHMAN  1,879,548
AUTOMATIC VENTING MACHINE
Filed May 21, 1930   5 Sheets-Sheet 1

INVENTOR
RETUS W. SETHMAN
BY Ely & Barrow
ATTORNEYS

INVENTOR
RETUS W. SETHMAN
BY
Ely & Barrow
ATTORNEYS

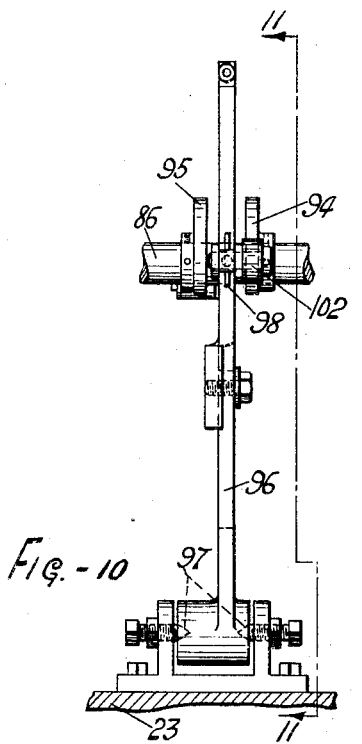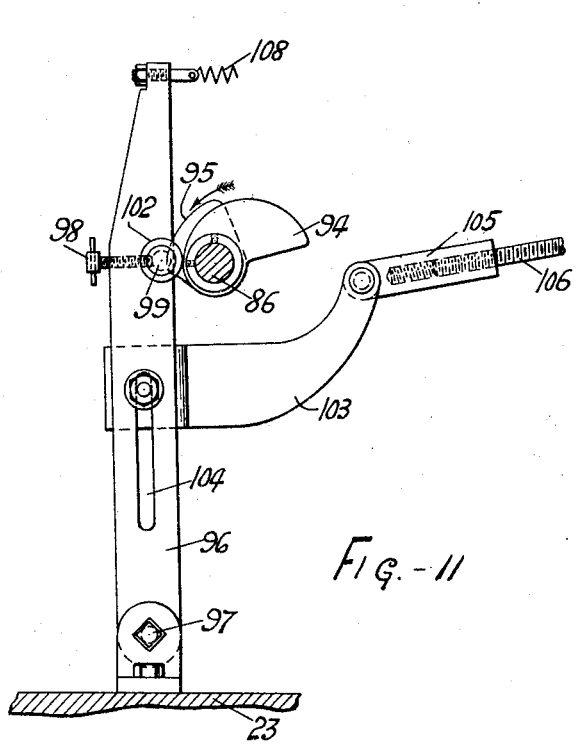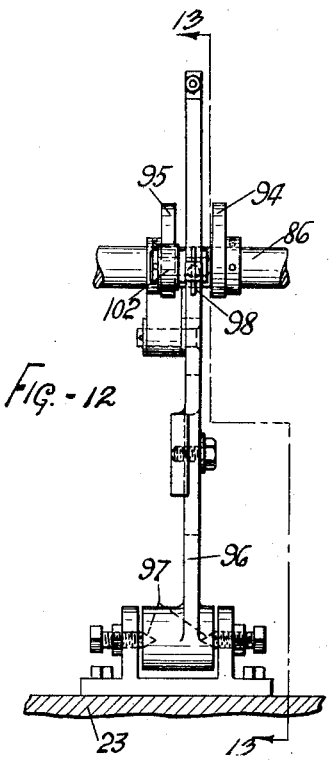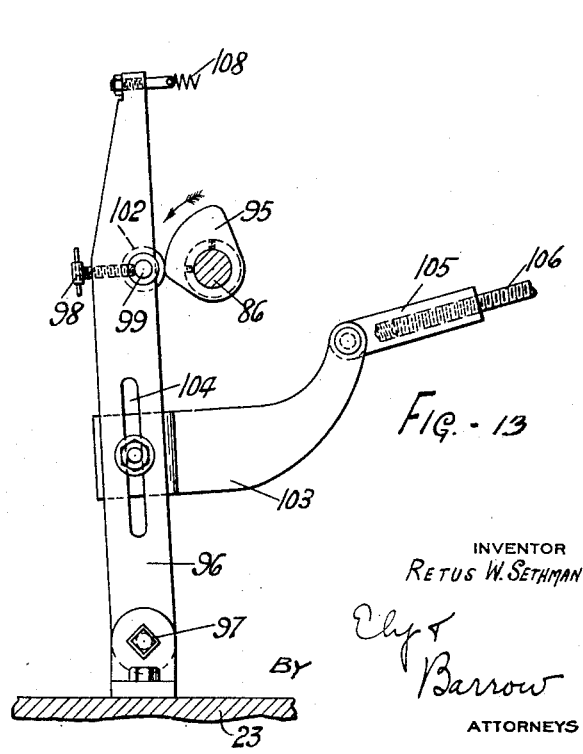

Patented Sept. 27, 1932

1,879,548

UNITED STATES PATENT OFFICE

RETUS W. SETHMAN, OF CUYAHOGA FALLS, OHIO, ASSIGNOR TO THE NATIONAL RUBBER MACHINERY COMPANY, OF AKRON, OHIO, A CORPORATION OF OHIO

AUTOMATIC VENTING MACHINE

Application filed May 21, 1930. Serial No. 454,288.

This invention relates to machines adapted to cut vents in engraved tire molds.

It is an object of the invention to provide a fully automatic machine for this purpose which is rapid and efficient in operation and which will serve to cut "bleeder vents" as well as the customary or usual vents between the tread configurations.

A further object of the invention resides in the provision of adjustable features in the machine which permit a plurality of sizes of molds having substantially any tread configurations therein to be readily handled. The adjustable features of the invention also permit the position of the vent to be cut initially to be changed without changing the position of mold on the indexing table.

A more particularly object of the invention is the provision of simple mechanism whereby one or more series of vents may be cut at spaced intervals between vents already cut in the mold.

The above and other objects of the invention are achieved by the apparatus illustrated in the accompanying drawings and described below, it being understood that the invention is not limited to the specific form and details shown and described.

In the drawings:

Figure 5 is a sectional view taken on line 5—5 of Figure 1;

Figure 6 is a sectional view on line 6—6 of Figure 1;

Figure 10 is an enlarged view of a portion of the cam shaft and rocker arm shown in Figure 3;

Figure 11 is a view taken on line 11—11 of Figure 10;

Figure 12 is a view similar to Figure 10, but with the venting cam and not the bleeder vent cam in operation;

Figure 13 is a view on line 13—13 of Figure 12;

Figure 14 is an enlarged elevation of a portion of the tire mold; and

Figure 15 is a sectional view taken on line 15—15 of Figure 14.

Figure 1:
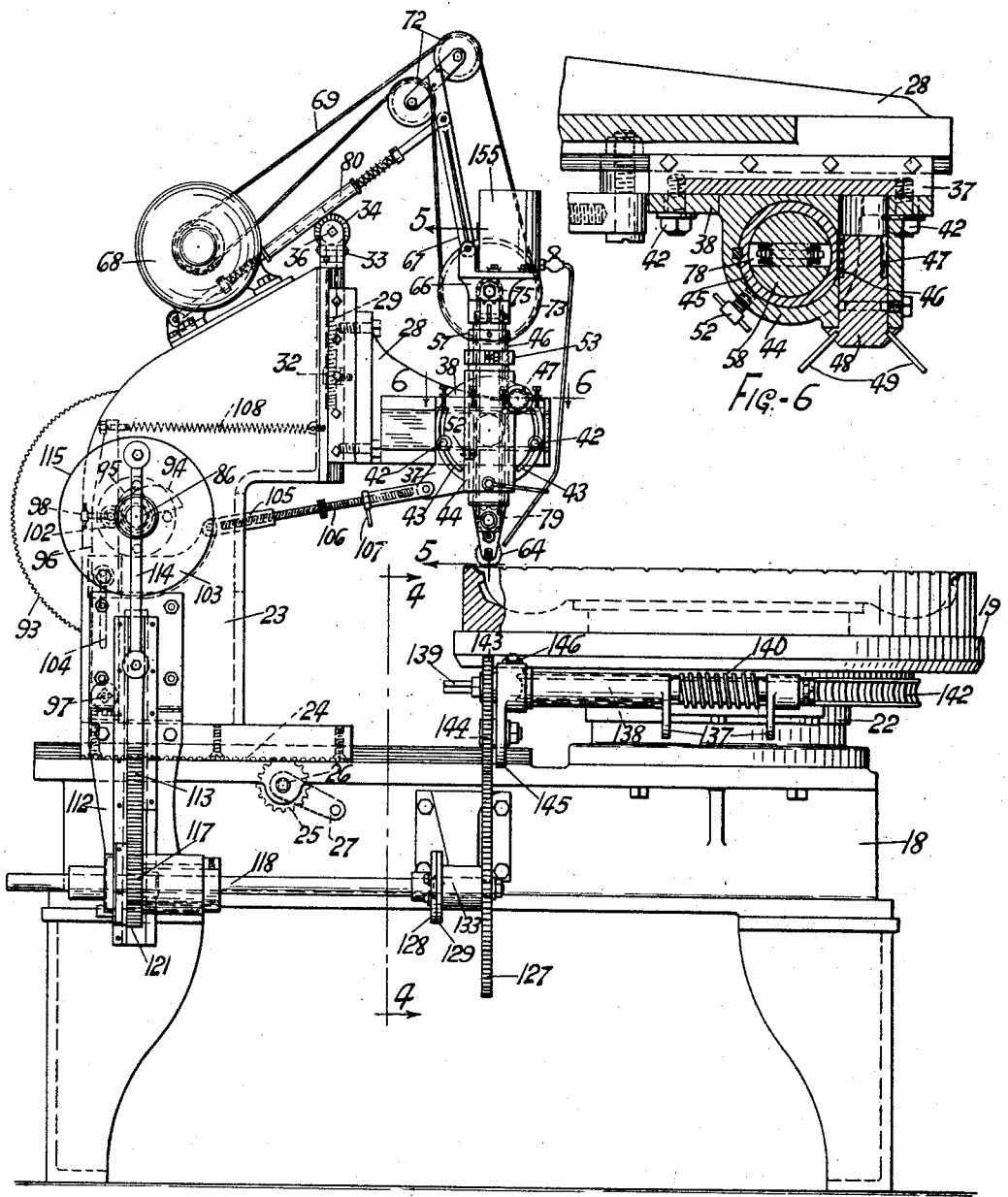
Figure 1 is a front elevation of a machine embodying the invention, showing the apparatus just after the indexing of the table has taken place and the cutter is about to cut a bleeder vent.
Figure 2:
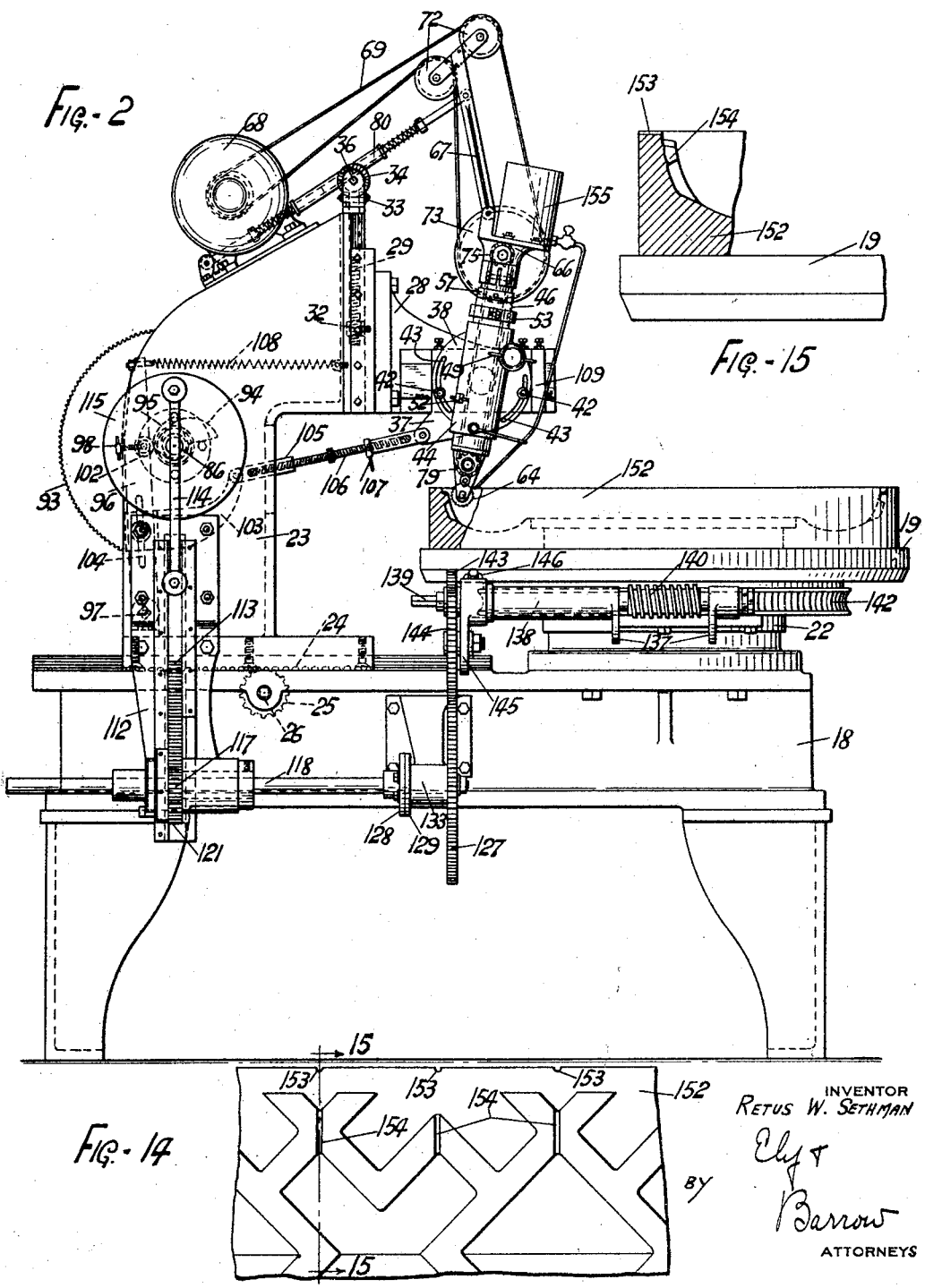
Figure 2 is a view similar to Figure 1, but showing the cutter about to cut a vent between cavities of the tread design.

Referring to the drawings, the numeral 18 indicates a bed which rotatably supports a table 19 upon a turret 22 fixed at one end of the bed. The other end of the bed 18 slidably carries a head 23 whose position on the bed is controlled by suitable means such as a rack 24 fixed to the head, which rack cooperates with a pinion 25 journaled in the bed. A square end 26 is provided on the end of the shaft carrying the pinion 25 so that the pinion can be operated by a suitable detachable handle 27.

Slidably gibbed to the side of the head 23 is an arm 28 whose vertical position on the head may be adjustably controlled by a long screw 29 cooperating with a nut 32 secured to the arm 28. The screw 29 is fixed to a journaled bevel gear 33 which engages with a bevel gear 34 secured to a shaft 35 formed with a squared end 36 which may be operated by the detachable handle 27.

As best seen in Figure 5, a slide 37, gibbed to the arm 28, carries a swivel head 38 which is adjustably and rotatably secured thereto by the provision of a cooperating axial socket and boss indicated at 39 and by cap screws 42 tapped into the slide and extending through arcuate slots 43 in the swivel head 38.

The swivel head 38 is formed with a tubular housing 44 in which is feathered a sleeve 45. A rack 46 (Figure 6) integral with the sleeve and cooperating with a pinion 47 formed on a shaft 48 journaled in the housing 44 provides suitable means to adjustably position the sleeve in the swivel head housing. Pins 49 may be secured in the end of the shaft 48 to serve as operating handles therefor and a set screw 52 may be provided to lock the sleeve in the adjusted position. In order to provide a more accurate or a final adjustment between the sleeve 45 and the housing 44, a split clamp 53 may be secured to the sleeve 45 (Figure 5), which clamp is formed with a lug having a tapped hole receiving an adjusting screw 54, the end of which contacts with the upper end of the housing 44. A lock nut 55 on the screw 54 holds the screw in its adjusted position.

Secured in the sleeve 45 by a shoulder 56 and a screw collar 57 is a spindle 58, at the lower end of which is journaled a cutter spindle 59 (Figure 5) which removably carries, through the agency of nut 62 and sleeve 63, a milling cutter 64. A removable side plate 65 is preferably provided at the lower end of the spindle 58 to assist in journaling the cutter spindle. Fixed to the top of the spindle 58 is a bracket 66 upon which is pivotally secured a rocker arm 67.

In order to drive the milling cutter 64, a motor 68 is provided on the head 23 from which a belt 69 extends over a pair of idler pulleys 72 carried on the arm 67 to a drive pulley 73 keyed to a shaft 74 journaled in the bracket 66. The shaft 74 has keyed thereto a sprocket 75, the bracket 66 being suitably apertured as at 76, which sprocket through the agency of a chain 77 received in channels 78 on opposite sides of the spindle 58 serves to drive a sprocket 79 keyed to a counter-shaft 82 journaled in the lower end of the spindle 58. Spur gears 83 and 84 keyed to shaft 82 and cutter spindle 59 cooperating through an idler gear 85 serve to complete the drive to the milling cutter.

Yielding means, such as the telescoping spring link 80, is pivotally connected between the head 23 and the pivoted rocker arm 67 and serves to keep the belt 69 tight in all positions of the spindle 58.

Figure 3:
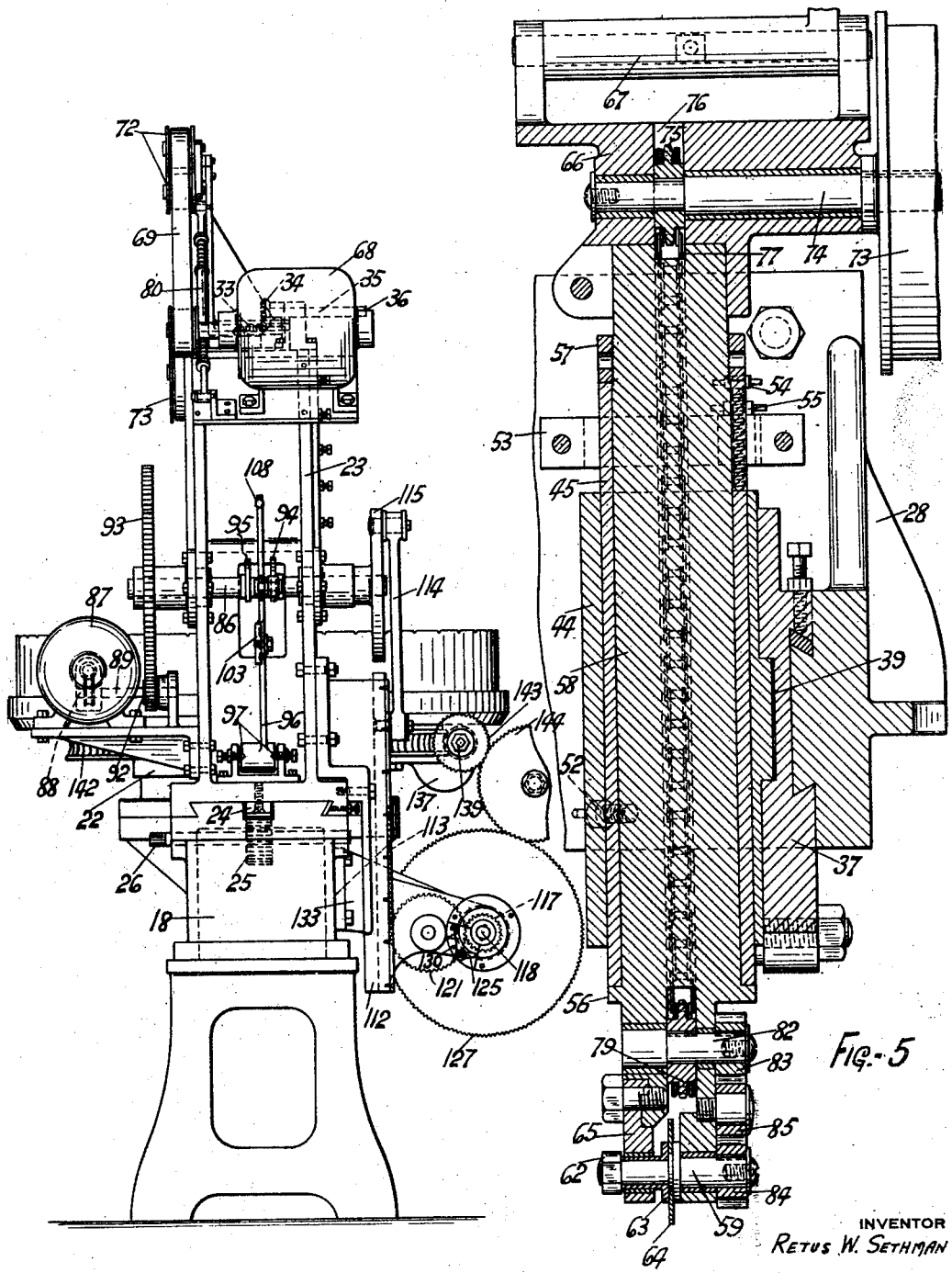
Figure 3 is an end elevation of the machine as shown in Figure 1.

To control the lateral position of the slide 37 on the arm 28, a shaft 86 is journaled in the lower portion of the head 23 and is adapted to be uniformly rotated by a motor 87 through reduction worm gearing 88, shaft 89 and gears 92 and 93, the last named gear being keyed or otherwise fixed to the shaft 86 (Figure 3). Removably secured to the shaft 86 are a pair of cams, the numeral 94 indicating the cam used when cutting the bleeder vents and the numeral 95 the cam used in cutting the main vents. A rocker arm 96 pivoted as at 97 in the lower part of the head 23 has secured thereto by a clamp screw 98 a stub shaft 99 upon which is journaled a roller 102 adapted to cooperate with one or the other of the cams 94 and 95 dependent upon which side of the rocker arm 96 the stub shaft and roller extend (see Figures 10 and 12).

An arm 103 is clamped to the rocker arm 96, Figures 11 and 13, a slot 104 formed in the arm permitting the arm 103 to be secured at different positions from the pivot 97. Pivotally connecting the end of the arm 103 and the slide 37 is a link 105, the length thereof being adjustable by the provision of the left and right hand screw 106 therein which is locked in position by nut 107. A spring 108 secured between the end of the rocker arm 96 and the head 23 serves to hold the roller 102 against the operating cam. The movement of the slide 37 outwardly or towards the table 19, as actuated by the spring 108 through the above mechanism, is adjustably limited by a clamp 109 secured to the arm 28. The clamp 109 is used in practice only in the cutting of the main vents. It is not used in the cutting of the bleeder vents as these vents are of substantially equal length in all mold sizes so that the bleeder cam 94 can be designed to give just this movement to the slide 37.

Secured to the side of the head 23 and extending down the side of the bed 18 is a bracket 112 in which is slidably gibbed a rack 113 which is arranged to be reciprocated through a connecting rod 114 pivotally secured to a crank disk 115 fixed to the end of the shaft 86. The bracket 112 is formed with a circular housing 116 (Figure 9) in which is rotated the hollow shaft 110 of a pinion 117 secured therein by a collar 120, which pinion engages with the rack 113 through an idler gear 121. Within the shaft 110 is slidably journaled an indexing shaft 118 formed with keyways 119 which slidably cooperate with keys 122 secured to a ratchet 123 having two oppositely positioned teeth. A pawl disk 124 is secured to the ratchet pinion 117 as by a driving fit and pivotally carries a pawl 125 on a pin 126 so that the reciprocating movement of the rack 113 is changed to periodic, partial rotation of the shaft 118. A spring 130, whose force may be adjusted, yieldingly holds the pawl finger 125 against the ratchet. A casing 131, secured to the pawl disk 124, is provided over the ratchet to carry the ratchet with the pawl disk.

Figure 4:
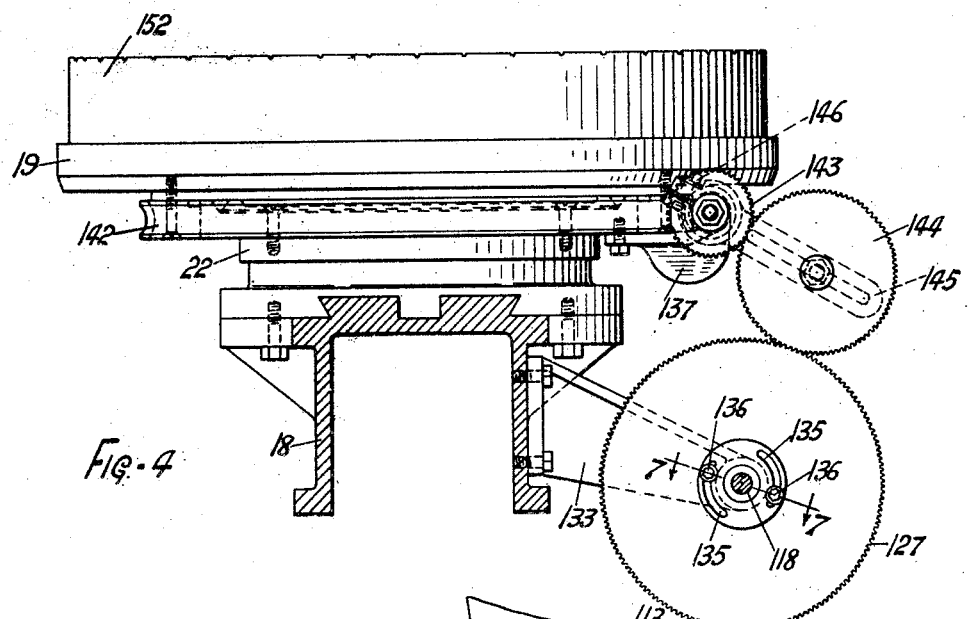
Figure 4 is a sectional elevation taken on line 4—4 of Figure 1.
Figure 7:
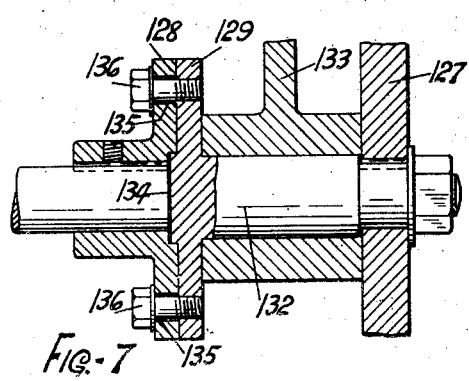
Figure 7 is a transverse sectional view taken on line 7—7 of Figure 4.

As illustrated in Figures 4 and 7, the other end of the indexing shaft 118 is secured to a gear 127 by angularly adjustable means which may include a pair of circular flanges 128 and 129, the flange 128 being keyed to the end of the shaft 118 and the flange 129 being formed integral with a shaft 132 keyed to the gear 127 and journaled in a bearing arm 133 secured to the bed 18. The flanges 128 and 129 are provided with an interengaging circular boss and recess as at 134 and the flange 128 with arcuate slots 135. Cap screws 136 extending through the slots 135 and tapped into the flange 129 adjustably clamp the flanges together.

A bracket 137 fixed to the turret 22 journals a shaft 138, squared as at 139, to which is secured a worm 140 engaging with a worm gear 142 bolted to the bottom of the rotatable table 19. A change gear 143 removably keyed to the shaft 138 is arranged to be driven from the gear 127 by the provision of an idler gear 144 journaled on a slotted arm 145 adjustably clamped as at 146 to the bracket 137.

A mold half 152 is removably secured to the table 19 by suitable means (not shown). By the mechanism described above, bleeder vents 153 for excess rubber and the main vents 154 between tread depressions are formed in the mold half.

Oil may be supplied to the milling cutter from a reservoir 155 secured on the bracket 66.

The operation of the device is as follows:

A previously engraved mold 152, in which the main and bleeder vents are to be cut, is secured to the table 19. While either vent may be cut first, the operation will be described for cutting the main vents first. For this operation, the shaft 99 is located as shown in Figure 12 so that the roller 102 carried thereon is in cooperation with the venting cam 95.

The position of the head 23 and the arm 28 may be adjusted by the handle 27 applied to the squared shaft ends 26 and 36 to bring the spindle 58 into operating relation with the mold. The height of the spindle is adjusted by turning the shaft 48 by way of the pin handles 49 and also by finally adjusting the height by screw 54, at which position the spindle may be locked by the set screw 52. The angular position of the spindle with respect to the mold can be adjusted by loosening the cap screws 42 and turning the swivel head 38, slots 43 permitting this movement. The cap screws 42 are tightened down when the swivel head is in the desired position.

The initial position of the slide 37 is adjusted by turning the right and left handed screw 106 in the connector 105 while the amplitude of the slide movement is controlled by adjusting the position of the arm 103 on the rocker arm 96. In view of the fact that the spring 108 alone moves the slide 37 outwardly as the roller 102 reaches the low portions of the cams, the clamp 109 can be adjusted to limit this outward movement so that the milling cutter 64 just clears the surface of the mold 152 which will allow the mold to index or move to the next position.

In clamping the mold 152 on the table 19, some care is taken to clamp it so that the cutter 64 after the above adjustments will engage with the proper portion of the mold to make a first vent. If, however, the table and the mold secured thereto are not quite in the exact arcuate position with respect to the cutter 64, the cap screws 136 may be loosened and the handle 27 applied to the squared end 139 of the shaft 138 to move the table to exactly position the mold and cutter after which the cap screws 136 are again tightened. The slots 135 in the flange 128 permit this adjustment without moving the indexing shaft 118.

The motor 68 is now started and drives the milling cutter 64 by way of the belt 69, shaft 74, chain 77 and gears 83, 84 and 85.

The motor 87 is next started and drives the shaft 86 and cams 95 and 94 at a uniform rate of speed through worm gears 88, shaft 89 and gears 92 and 93. The roller 102 carried on the rocker arm 96 is held against the cam 95 by the spring 108 so that the rotation of the cam oscillates the rocker arm 96. The rocker arm being connected to the slide 37 by the arm 103 and connector link 105 will move the slide 37 and thus the swivel head 38, spindle 58 and cutter 64 back and forth with a movement controlled by the profile of the cam 95.

This movement, as will be understood, is such that the inward cutting movement or stroke of the slide and cutter is relatively slow and positive, but the outward or recovery stroke is quick. The outward movement or recovery of the slide is not positive but relies on the spring 108. For this reason, the clamp 109 can be adjusted to limit the outward movement of the slide 37 so that the cutter 64 just clears the mold 152, thereby preventing undue wear on the slide.

The indexing apparatus for periodically moving or stepping the table functions as follows:

The crank disk 115 secured to the end of the shaft 86 reciprocates the rack 113 through the connecting rod 114. The reciprocating motion of the rack 113 is changed to periodic rotary movement of the indexing shaft 118 through the agency of the pinion 117, ratchet 123 and pawl 125.

The above mechanism is designed so that one complete reciprocation of the rack 113 will give the indexing shaft 118 one complete revolution. The one revolution of the indexing shaft will step the mold 152 and table 19 to the next vent cutting position by operating through gear 127, secured to shaft 118, idler gear 144, change gear 143, secured to shaft 138, worm 140 and worm gear 142 fixed to the table 19. It will be seen that the ratio of the gear 127 to the change gear 143 controls the distance the mold is stepped or indexed and thus the number of vents cut in the mold. By changing the gear 143 and adjusting the idler gear 144 on its slotted bracket 145 to complete the drive between the change gear and the gear 127, the apparatus can be adjusted to cut vents where and as often as desired in substantially any engraved mold where the design is periodically repeated.

Figures 8, 9:
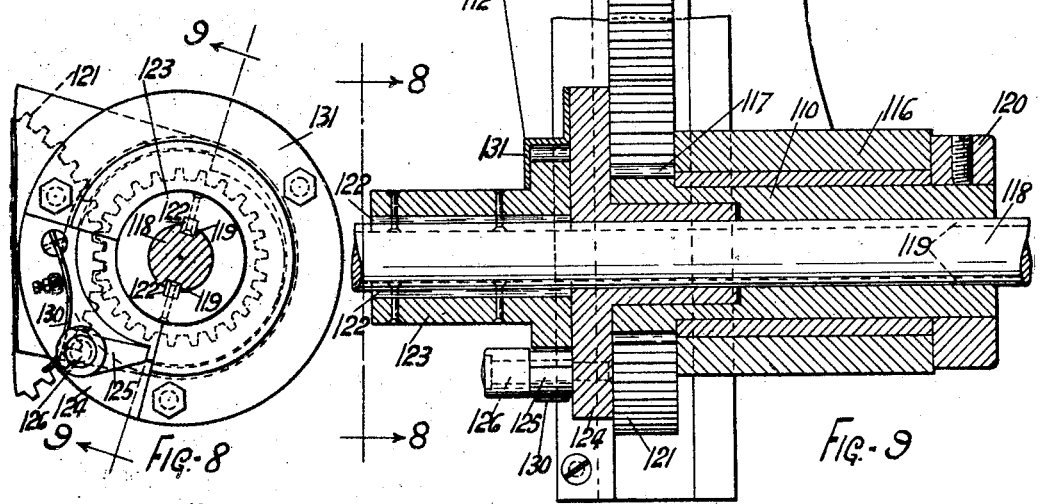
Figure 8 is an enlarged view of a portion of Figure 3, also taken on line 8—8 of Figure 9, illustrating the ratchet and pawl connection between the indexing shaft and the cam shaft controlling the cutter operation.
Figure 9 is an axial sectional view taken on line 9—9 of Figure 8.

As seen in Figure 8, the ratchet 123 has only two teeth which are diametrically opposite. This construction permits vents to be cut midway between vents already cut in the mold without changing the change gear or the position of the mold on the table. To do this the handle 27 is applied to the squared end 139 of shaft 138 so that rotation of the handle will turn the indexing shaft 118 through 180° and also move the mold and table one-half a space or midway between the formerly cut vents. When the indexing shaft is rotated, the pawl 125 merely moves around the ratchet 123 and engages with the tooth diametrically opposite to the one it formerly engaged with. If a second series of vents is desired to be cut at a different plane in the mold, the cutter is lowered to the proper point in the manner described and the appropriate settings made.

It will be understood that the cutting of the vents occurs when the mold is stationary and that the indexing or stepping of the mold to the next cutting position occurs only after the cutter 64 has completed the cutting of the vent and has moved back out of the vent.

To cut the bleeder vents 153, the set screw 98 is loosened and the shaft 99 carrying the roller 102 is inserted from the other side of the rocker arm 96 (Figures 10 and 11) so that the roller cooperates with the bleeder cam 94. The set screw 98 is now again tightened down and the arm 103 is moved upwardly on the rocker arm 96 so that the amplitude of the slide movement is increased. The various other parts of the apparatus are set as shown in Figure 1 and the operation is repeated in a manner identical with that described heretofore in the cutting of the main vents.

Cutting oil is supplied to the milling cutter 64 from the reservoir 155. To change the milling cutter 64, the nut 62 is removed and then the side plate 65 which allows the sleeve 63 to be pulled off so that the cutter can be removed and another cutter substituted therefor.

It will be evident from the foregoing description that the machine is automatic once it has been adjusted and that it will cut vents completely around the mold without attention. This allows a single operator to run several machines at the same time as he can set up a mold on one machine while the other or others are cutting.

It will be observed that the machine as shown and described is capable of automatic operation and will cut the vents much more rapidly and economically than previous devices for this purpose. It is also extremely flexible in its operation and setting and can be used in almost any mold work. The principles of the invention may be applied to other uses.

As many changes could be made in the construction, it is intended that all matter contained in the foregoing description or shown in the accompanying drawings shall be interpreted as illustrative only and not in a limiting sense. Accordingly, various modifications and applications of the invention can be resorted to without departing from the spirit of the invention or the scope of the appended claims.

What is claimed is:

1. In a tire mold venting machine, a bed, an indexing table rotatably supported thereon, a head adjustably secured to said bed, a vertically adjustable arm fixed to said head, a slide on said arm, a swivel head adjustably secured to said slide, a spindle adjustably secured to said swivel head, a milling cutter journaled at the lower end of said spindle, means for driving said milling cutter, a cam shaft, means for uniformly rotating said cam shaft, a cam mounted on said shaft, a rocker arm pivoted adjacent said shaft and cooperating with said cam, linkage pivotally connecting said slide and said rocker arm, a crank secured to said cam shaft, a rack reciprocated by said crank, an indexing shaft, a pinion cooperating with said rack, ratchet means securing said pinion on said indexing shaft, and change gears connecting said indexing shaft to said table.

2. In a tire mold venting machine, a bed, an indexing table rotatably supported thereon, a head adjustably secured to said bed, a slide on said head, a spindle adjustably secured to said slide, a milling cutter journaled at the lower end of said spindle, means for driving said milling cutter, a cam shaft, means for uniformly rotating said cam shaft, a cam mounted on said shaft, a rocker arm pivoted adjacent said shaft and cooperating with said cam, linkage pivotally connecting said slide and said rocker arm, a crank secured to said cam shaft, a rack reciprocated by said crank, an indexing shaft, a pinion cooperating with said rack, ratchet means securing said pinion on said indexing shaft, and change gears connecting said indexing shaft to said table.

3. In a vent cutting machine, a spindle, a milling cutter journaled in one end thereof, sprockets journaled at the ends of said spindle, driving means between said milling cutter and the sprocket adjacent thereto, a driving chain over said sprockets and lying in channels in said spindle, means for driving the non-adjacent sprocket, a sleeve removably encasing said spindle, and a swivel head, said sleeve and spindle being adjustably secured thereto.

4. In a vent cutting machine, a spindle, a milling cutter journaled in one end thereof, sprockets journaled at the ends of said spindle, driving means between said milling cutter and the sprocket adjacent thereto, a driving chain over said sprockets and lying in channels in said spindle, and a sleeve removably encasing said spindle.

RETUS W. SETHMAN.